United States Patent [19]
Liao et al.

[11] Patent Number: 5,218,671
[45] Date of Patent: Jun. 8, 1993

[54] IMAGE COLOR CORRECTION SYSTEM AND METHOD

[75] Inventors: Ho-Long Liao; Edward K. Falk, both of Rockford, Mich.

[73] Assignee: Computer Design, Inc., Grand Rapids, Mich.

[21] Appl. No.: 359,118

[22] Filed: May 31, 1989

[51] Int. Cl.$^5$ .............................................. G06F 3/00
[52] U.S. Cl. ................................... 395/131; 395/128; 340/703
[58] Field of Search ..................... 364/518, 521, 522; 340/747, 750, 703, 706; 395/131, 128, 129

[56] References Cited

U.S. PATENT DOCUMENTS

| | | | |
|---|---|---|---|
| 3,693,168 | 9/1972 | Halkyard et al. | 340/172.5 |
| 4,058,849 | 11/1977 | Fitzgerald et al. | 364/520 |
| 4,959,790 | 9/1990 | Morgan | 364/518 |
| 4,967,373 | 10/1990 | Ginsburg | 364/518 |

OTHER PUBLICATIONS

Commonly-Assigned, U.S. patent application Ser. No. 363,205 for Image Color Modification in a Computer-Aided Design System, filed Jun. 8, 1989 by Ho--Long Liao.
Foley, J. D., Van Dam, A. "Fundamentals of Interactive Computer Graphics" (pp. 611-616, Addison-Wesley, 1982).

Primary Examiner—Phu K. Nguyen
Attorney, Agent, or Firm—Price, Heneveld, Cooper, DeWitt & Litton

[57] ABSTRACT

A system and method for correcting errors in the colors of an image in a computer-aided design system; such errors being introduced by a process such as the production of a hard-copy of an image displayed on a graphic CRT. Tools are provided for the user to select "registered" colors and to determine, either manually or by system calculation, corrected values of such registered colors that will produce the desired image on the hard-copy. The manual selection technique provides tools for iteratively creating charts of related, but varied, color squares and sending the charts to the output device. The resulting hard-copy is compared by the user with the chart displayed on the CRT and the user's selection is processed by the system. In the other technique, the hard-copy image of such color chart is re-entered to the system through an input device and the error between the original and processed color patches is calculated and applied to determine corrected colors. Once a palette of registered and corrected colors is developed, it may be applied to correct images composed of such registered colors or to correct images composed of virtually any combination of colors. For the latter type of images, color values in the image that do not correspond to "registered" colors are corrected by creating a new 3-D color space based upon the existing registered colors and assigning a corrected value of each color as a result of the "influence" of adjacent registered colors in the created color space.

27 Claims, 11 Drawing Sheets

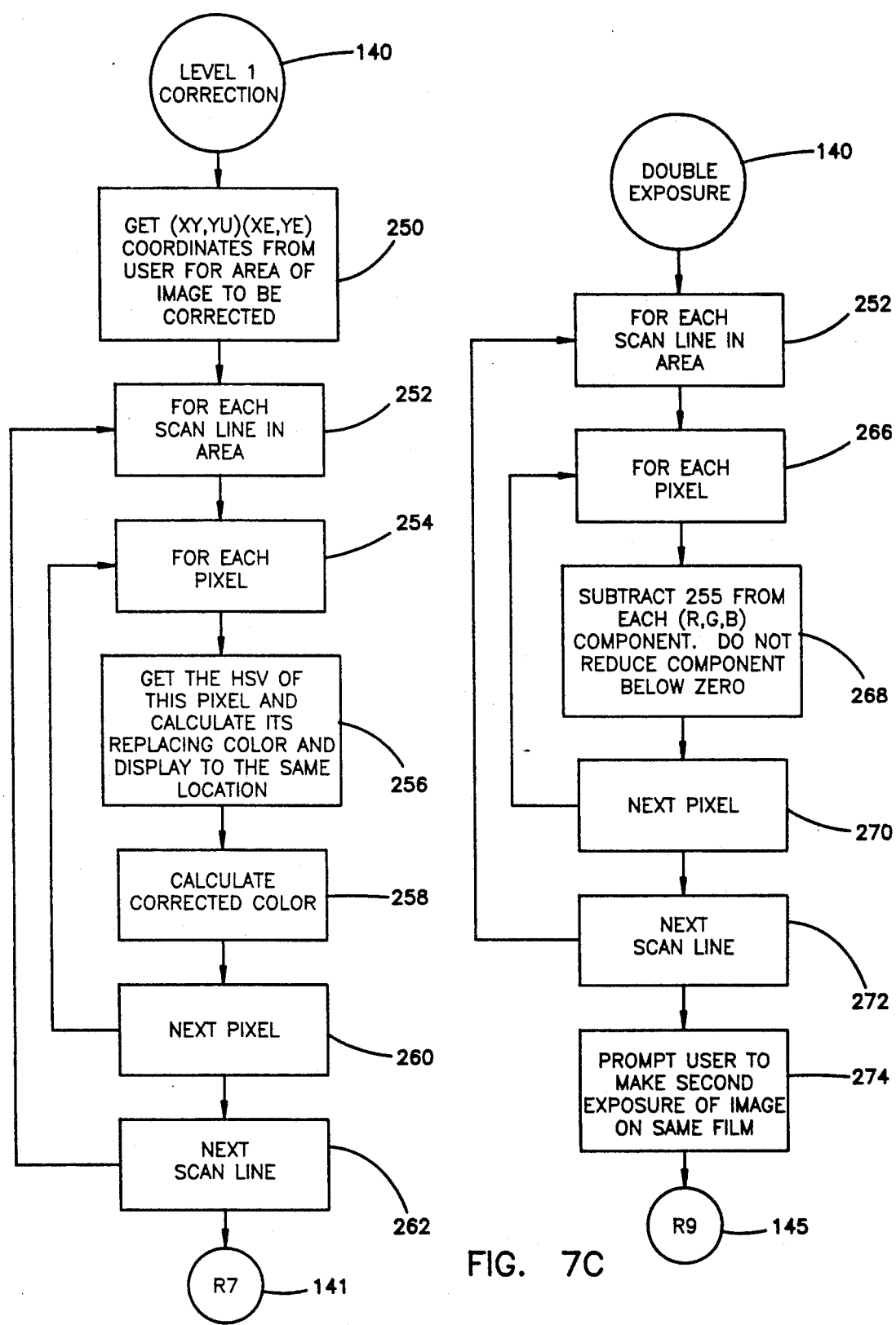

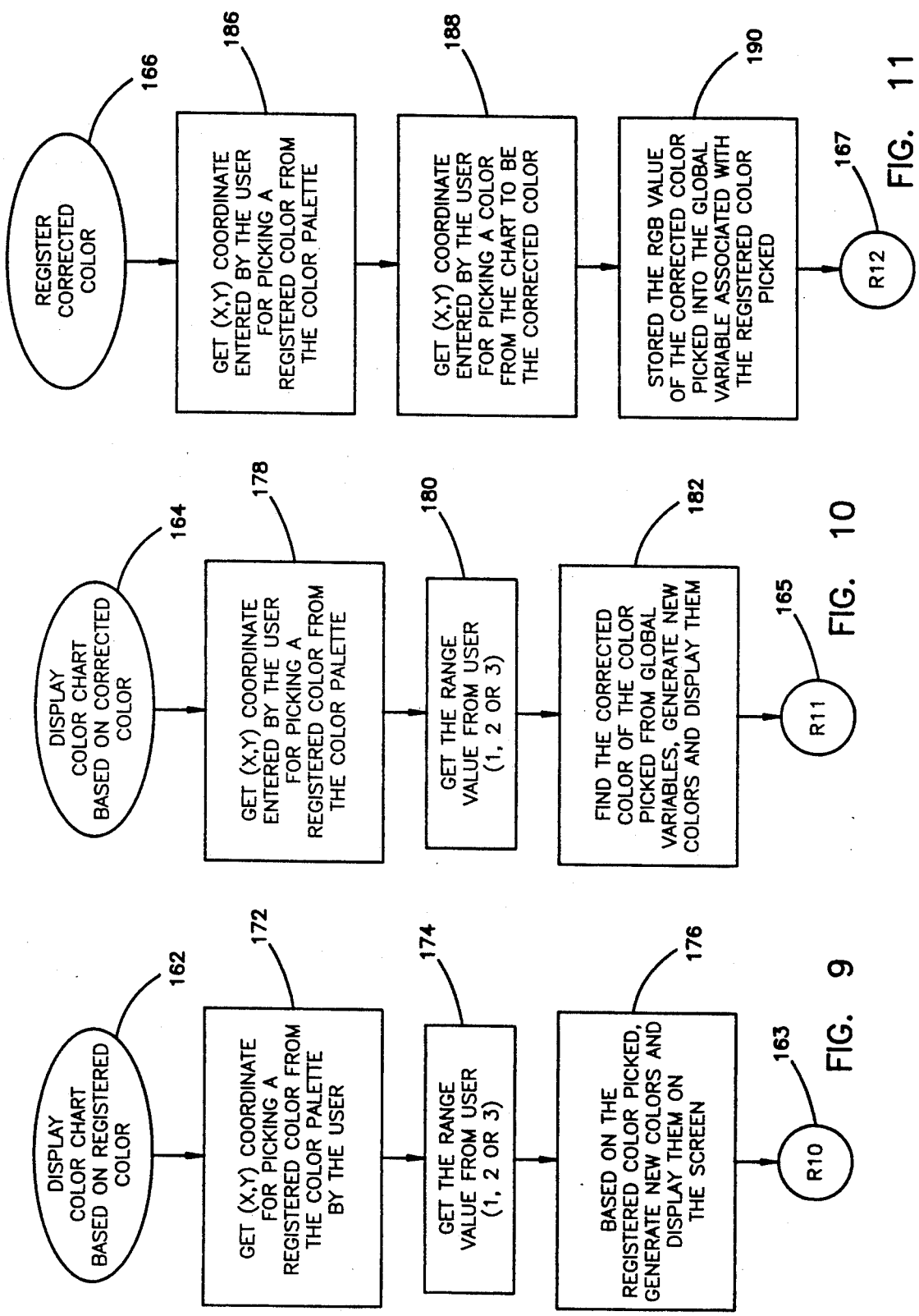

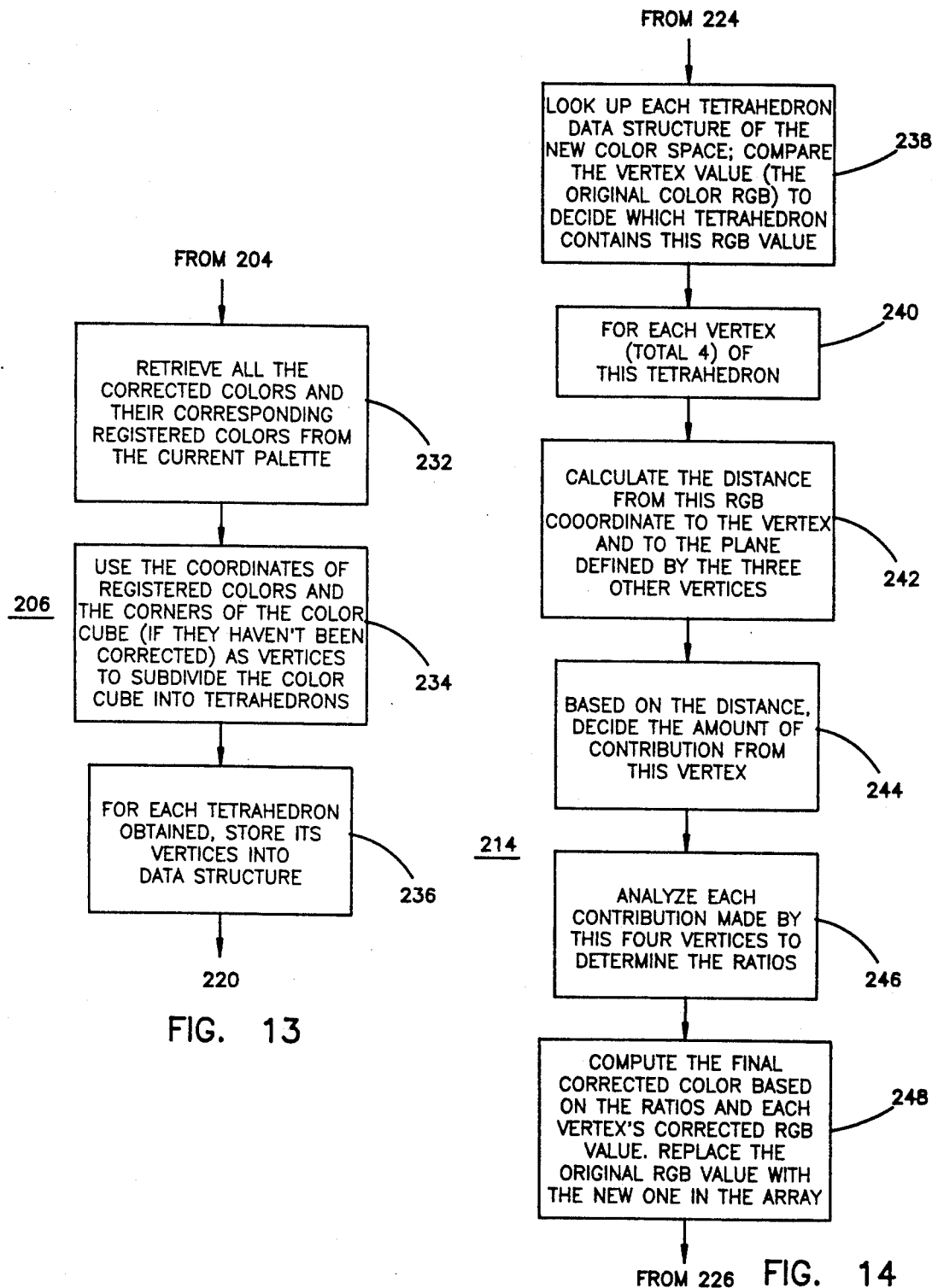

IMAGE COLOR CORRECTION SYSTEM AND METHOD

BACKGROUND OF THE INVENTION

This invention relates to computer-aided design systems, and in particular to a system and method for providing enhanced image color processing in such a two-dimensional design system.

In a computer-aided design system, high resolution graphic capabilities provide the ability to enter images with a digital camera or allow the designer to create images using "paintbox" programs. When the image on the graphic CRT is completed, an output camera or printer may produce a hard-copy of the image. Because of the manner in which the components of a computer-aided design system interprets color, errors are introduced that cause the hard-copy image to appear differently from the image as it appears in the real world or as displayed on the graphic CRT.

SUMMARY OF THE INVENTION

The present invention is directed to providing a system and method for correcting the colors in an image in a computer-aided design system such that the image produced from the output of the system will have the desired appearance. The present invention provides the user of a computer-aided design system with tools and techniques for replacing the colors of an image with proper colors before the image is reproduced on an output device so that the color-distorting effects caused by the output process, or other colors distorting process, may be corrected. According to one aspect of the invention, a method for correcting color errors introduced in computer-generated images includes creating a color chart having one or more colors and performing the error-inducing process on the chart such that the color chart is distorted by the process. The method further includes determining the error that has been introduced by the process in adjusting the colors and images before performing the error-inducing process on the images as a function of the determined error such that the image will have correct colors after the process is performed.

While the above aspect of the invention is capable of correcting the color of images that are considered a flat-color image made up of primary colors only, many images processed in a computer-aided design system, such as photographs and images entered into the system through video cameras and the like, are composed of a myriad of differently colored pixels having (R, G, B) values which vary continuously over a large spectrum. With such continuously-colored images, it is virtually impossible to identify all of the colors in the image and to determine the correction to the colors that will produce the desired appearance of the image at the output of the system. Therefore, according to another aspect of the invention, each pixel in a continuously-colored image to be corrected is examined and, if its color is identical with one of the original colors, for which a corrected value has been determined, the color of the pixel is changed to that of the corrected value. For image pixels whose color is not identical with an original color, an interpolation from other corrected values is made in order to construct a corrected value to be applied to the pixel.

These and other related objects, advantages, and features of this invention will become apparent upon review of the following specification in conjunction with the drawings.

BRIEF DESCRIPTION OF THE DRAWINGS

FIG. 7b is a flowchart illustrating the calculate corrected color function of the present invention;

FIG. 7c is a flowchart illustrating the double exposure function of the present invention;

FIG. 9 is a flowchart illustrating the display color chart based on registered color flowchart according to the invention;

FIG. 10 is a flowchart illustrating the display color chart based on corrected color function of the present invention;

FIG. 11 is a flowchart illustrating the register corrected color function of the present invention;

FIG. 13 is a flowchart illustrating the defining a corrected color space function of the present invention; and FIG. 14 is a flowchart illustrating the interpolation function of the present invention.

DETAILED DESCRIPTION OF THE PREFERRED EMBODIMENT

For the purpose of the following description, there are a few assumptions made about the nature of images that are displayed on standard graphic CRTs of CAD systems. As set forth in detail in "Fundamentals of Interactive Computer Graphics", Foley, J. D. and Van Dam, A. (pp. 611–616 Addison - Wesly 1982), the disclosure of which is hereby incorporated herein by reference, the image, which is displayed in two-dimensional space, is composed of a rectangular array of pixels, the smallest unit of the CRT; and the color of each pixel is represented by its red, green, and blue components, each of which is variable between zero and 255. Thus, the (R, G, B) value determines the color of the corresponding location currently displayed on the CRT. The (R, G, B) value for each pixel of an image may be stored in the computer's memory, and retrieved when desired. The two-dimensional image may be entered as an input to the CAD system through a video camera, scanner, or by development by the user with a standard CAD software.

(I) Description of the Hardware

Figure 1:
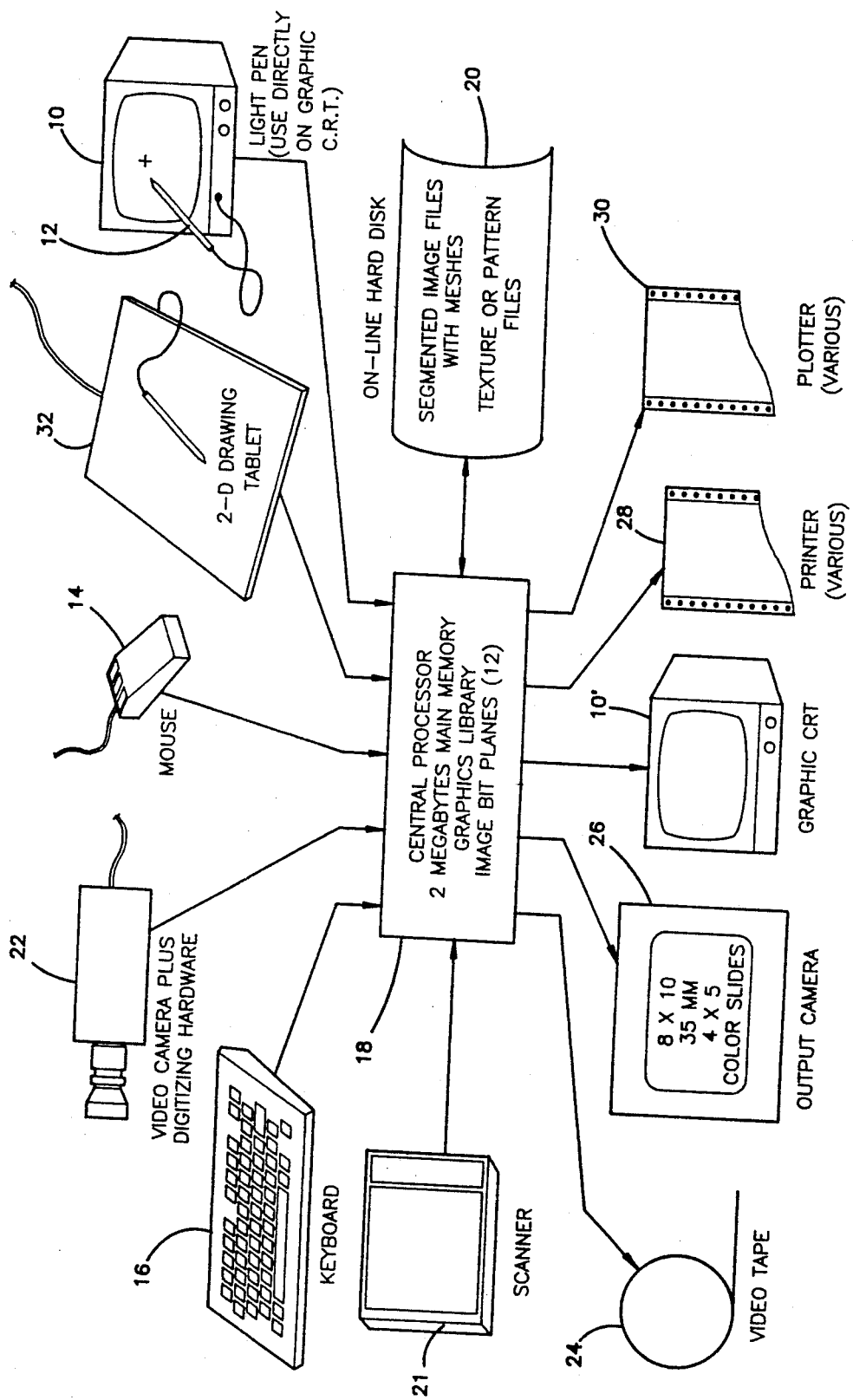
FIG. 1 is an illustration of CAD hardware system useful in the present invention.

The hardware requirements to support the present invention are basically those needed to support a standard two-dimensional CAD system. An illustration of such a system is given in FIG. 1. The hardware includes a graphic visual input/output device such as a CRT 10 or 10', with a standard light pen 12 or mouse 14 as a locating instrument, a keyboard 16, a central processing unit 18 that will support program control of the individual pixels displayed on the graphic CRT 10 or 10' through use of a graphics command library, and a data storage unit 20, preferably a hard disk storage unit. If the images used in the system are to be input through a video input, a video camera 22 and standard associated frame capture hardware (not shown) are also required. For input of printed images, scanner 21 is provided. Images can also be inputted with a standard two-dimensional digitizing drawing device 32. Data storage unit 20 is needed for storage of the data files supporting the two-dimensional software system, including the digital graphic images. Another consideration is the number of simultaneously displayable colors possible on the graphic CRT 10 or 10' of the computer system; a minimum of 256 simultaneously displayable colors is required. Adequate facilities can be found in the Engineering Workstations currently available from several venders such as Silicon Graphics Inc., Apple Computer Inc., and SUN Microsystems.

The present invention is preferably carried out with a Silicon Graphics Inc. IRIS workstation with a three-button mouse and a graphic CRT having a viewable resolution of 768 by 1024 pixels, a central processor having 2 megabytes of main memory and a 170 megabyte hard disk for supporting 16 million simultaneously displayable colors on the graphic CRT.

The output of the system can be directed in known manner to a video tape recorder 24, an output camera 26 capable of producing color slides or photographs of various sizes, a hard-copy printer 28, or a plotter 30.

(II) Description of the Software

In this specification, the following definitions apply to these terms:

| | |
|---|---|
| 1) Color: | Representation in (R, G, B) space where R(red), G(green) and B(blue) are scalar values in the range 0.0-255.0. |
| 2) Registered Color: | Any color selected by user for correction; designated (rR, rG, rB). |
| 3) Corrected Color: | The "correct" color of a registered color; designated (cR, cG, cB). Is applied to the image prior to processing the image to an output device such that the image from the output device has a desired appearance. |
| 4) Color Palette: | A disk file containing a set of registered colors and their corrected colors (if any). More than one color palette may exist in the system. However, the software can use only one palette at one time. |

Figure 2:
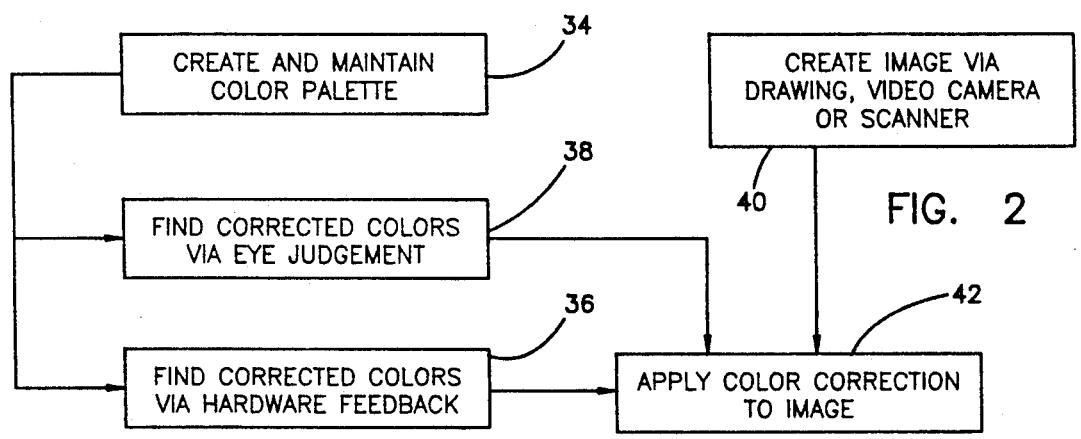
FIG. 2 is a flowchart illustrating a portion of the CAD system according to the present invention.

Referring to FIG. 2, system 15 provides the tools for a user to replace the colors of an image with proper colors before the image is developed on an output device, such as a camera 26 or a graphics printer 28, using a two-dimensional CAD system programmed in accordance with the invention. Using such programmed 2-D CAD system, the user first creates and edits (34) a color palette by adding, deleting and replacing registered colors. "Correct" colors may then be found for registered colors in a palette using color analyzing functions employing hardware feedback (36) or color displaying functions which are applied by the user to allow the user to select corrected colors (38). Finally, a color palette of registered colors and corresponding corrected colors is applied in a function for applying color correction (42) to an image created in known manners at 40. Since most CAD systems are menu driven, the following will describe how a user would execute the functions by selecting from a menu displayed on the graphic CRT of the system.

(a) Creating Color Palette

The first step is to create and edit a color palette so that the system can utilize registered colors in the palette to correct the colors of an image. Basic capability for creating and editing color palette (34) can be provided in a menu with the following choices:

---
ADD registered color(s)
DELETE registered color(s)
REPLACE registered color(s)
---

The "ADD" function permits user to add (register) a new color to the color palette by typing the (R, G, B) or by picking a color on the screen using a locating instrument such as light pen 12 or mouse 14. This new color then becomes one of the registered colors in the palette. The "DELETE" function permits user to remove registered color(s) from the palette along with the corrected color(s) by selecting the registered color(s) to be deleted using a locating instrument. The "REPLACE" function permits user to change the (R, G, B) of an existing registered color.

Figure 3:
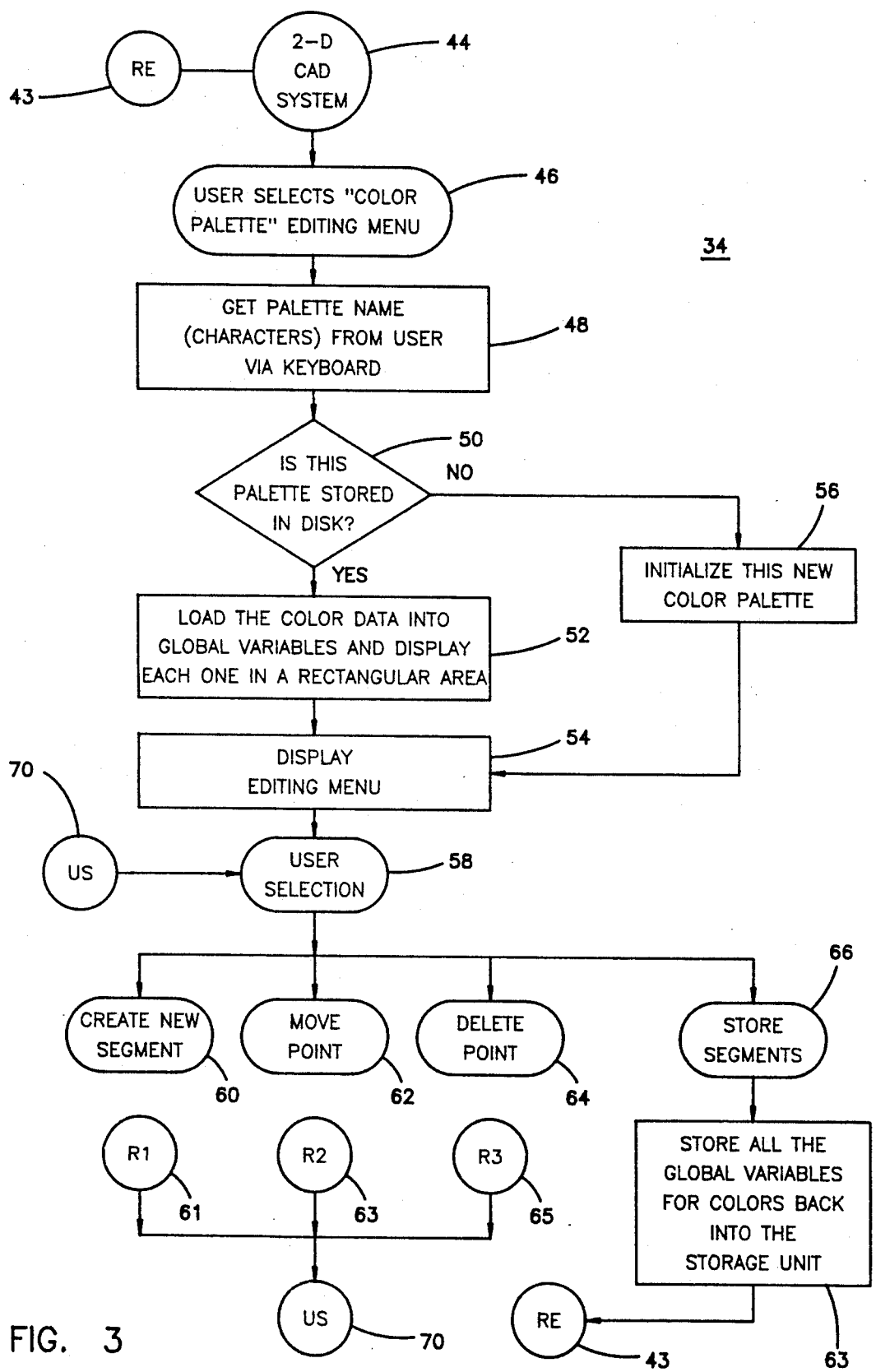
FIG. 3 is a flowchart illustrating the color palette editing functions of the present invention.

FIG. 3 illustrates the main flowchart for the color palette generation and editing functions 34, and outlines a function that allows the user to select various subfunctions for performing color palette editing. Once invoked from the two-dimensional CAD system (44, 46), the user is prompted to enter the name of the color palette of interest (48) using keyboard 16. If the specified palette is not found in the storage unit 20, then a new palette is generated (50, 56). If the specified palette is found, then its registered colors and corrected colors are retrieved from the storage unit 20 and stored in a global variable and an array of colored squares, representing existing registered colors in the selected color palette, are displayed (52) in the menu area of the graphic CRT. The system then displays a menu for the user to select (54, 58) among the individual subfunctions 60–64 provided for palette editing. Each of the subfunctions 60–64 that may be invoked by a user selection performs a portion of the palette editing function. Once each of these subfunctions 60–64 finishes its task, control is returned to the palette generating and editing function indicated by the labels R1–R3. Control is then passed back to the menu selection (US) 70 so that the user may proceed to the next function. When the "exit" function 66 is selected, this function terminates and all the parameters stored in global variables are to the storage unit 20 for later retrieval 68. Control then passes back to the two-dimensional CAD system (43, 44).

Figures 4, 5:
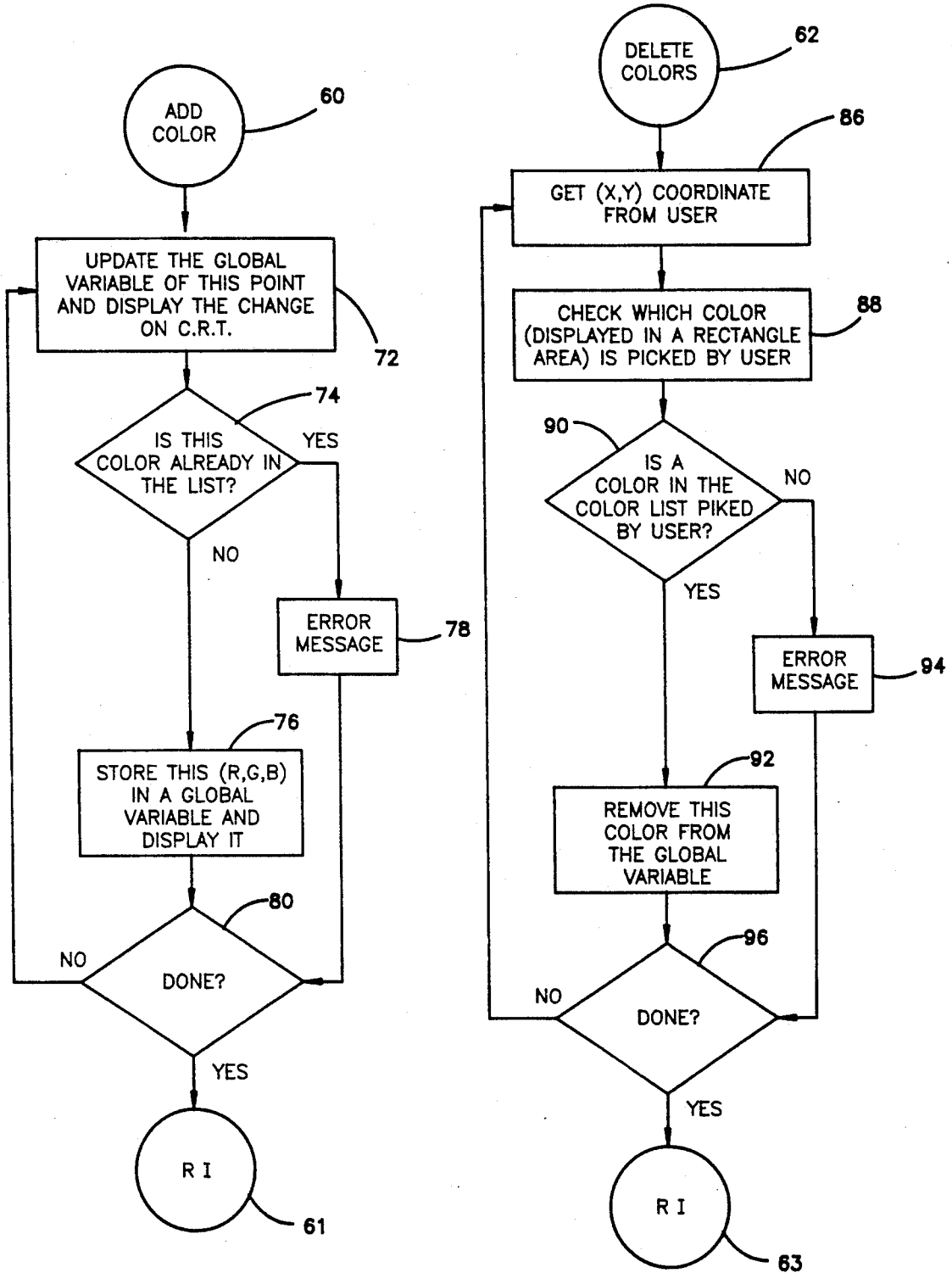
FIG. 4 is a flowchart illustrating the color adding function of the present invention.
FIG. 5 is a flowchart illustrating the color deleting function of the present invention.
Figure 6:
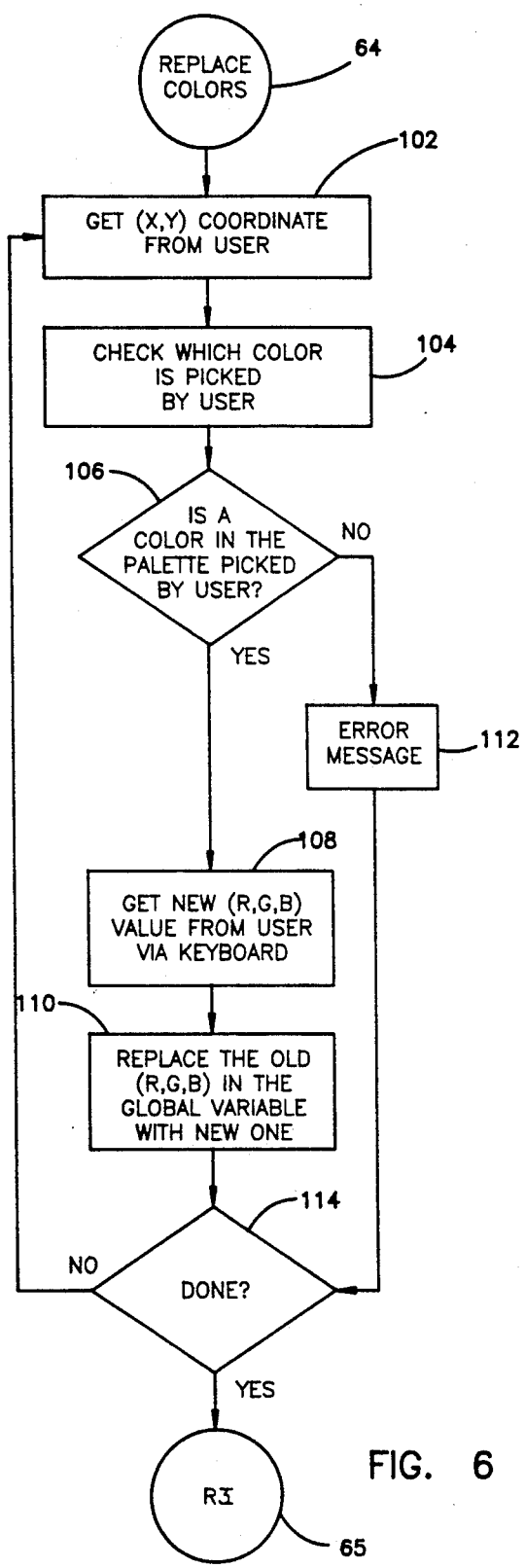
FIG. 6 is a flowchart illustrating the color replacing function of the present invention.

FIGS. 4, 5 and 6 are flowcharts for the subfunctions for creating and editing a color palette. After the user selects the "Add color" function 60 (FIG. 4), the system receives an (R, G, B) value from user (72) by prompting the user to pick a color from the images current displayed on the graphic CRT 10 with a locating instrument or by entering the (R, G, B) value of the new color via a keyboard 16. The received color is examined (74) to see if an identical color already exists in the color palette. If so, an error message is generated (78) and this color will not be registered in the color palette. If the received color does not already exist, then the system creates a new global variable and stores (76) this (R, G, B) value which becomes one of the registered colors of the current palette. The new registered color joins other registered colors displayed on the menu area of the graphic CRT. The user can continue to add new colors to the color palette until the user indicates to the system that no additional colors are to be added (80).

FIG. 5 is a flowchart illustrating the "Delete color" function. Once this function is selected, the user is prompted to select (86) the registered color to be deleted from the color palette displayed on the menu area using a locating instrument. The system examines (88) the (x, y) coordinate obtained from the user and determines (90) if the color selected by the user is existing in the palette. If not, then an error message 94 is issued and no color is deleted. Otherwise, the selected color is deleted (92) from the current color palette and the global variable it occupied is cleared. The user can continue to delete registered colors from the color palette until the user indicates to the system that no additional colors are to be deleted (96).

FIG. 6 is a flowchart illustrating the "Replace color" function 100. In a manner similar to the "Delete color" function 62, the user is prompted to select a color and the system determines if the selected color exists for the palette (102, 104, 106, 112). Once an existing registered color is selected, the user is prompted to pick a new color on the graphic CRT using a locating instrument or to enter a new (R, G, B) value with the keyboard (108). The (R, G, B) value for this new color then replaces (110) the original one stored in the global variable. The user may repeat this function to replace additional registered colors until the user indicates to the system that no additional colors are to be replaced (114). When the "exit" function 66 is selected by the user, all the global variables associated with the registered colors are stored (68) to the storage unit 20 and the control passes to the two-dimensional CAD system 44.

(b) Finding Corrected Colors

1. Hardware Feedback

When the user is satisfied with the registered colors in the color palette, the next step is to determine the corrected color for each registered color in the palette. There are two functions that provide the user with tools for finding the corrected colors. The first function (36) provides the user with tools to send a color chart displayed in graphic CRT 10 containing the registered colors to an output device, such as camera 26, and then input the resulting photograph of the color chart back into the system to allow the system to determine the color "error" created by the process of developing a hard-copy of the color chart by the output device. The system would then modify the (R, G, B) values of the registered colors based on the "error" to provide corresponding corrected colors which will more closely approximate the registered colors offering processing to the hard-copy. To execute the first method, the following menu is provided:

---
Display registered color chart
Calculate corrected color
Display corrected color chart
Modify corrected color
Display colors over 255
---

In order to produce an image on the graphic CRT 10 of the registered colors in a palette selected by the user, the user selects the "Display registered color chart" function. The system will display all the registered colors in a color chart containing an array of colored squares, one for each registered color. The user then instructs the system to send the chart to an output device using conventional methods. The hard-copy of the image produced by the output device is then fed back to the system using an input device such as scanner 21 or the like. The user then selects the "Calculate corrected color" function to find the corrected color for each registered color. The function is accomplished by the system scanning the registered colors and determining the changes in (R, G, B) of each registered color caused by the output/input cycle. These changes then are added to the original (R, G, B) of each registered color to compensate for the "error" occurred during the output/input cycle. These new (R, G, B) values are then designated corrected colors and are stored along with their corresponding registered colors in the appropriate color palette.

Figure 7A:
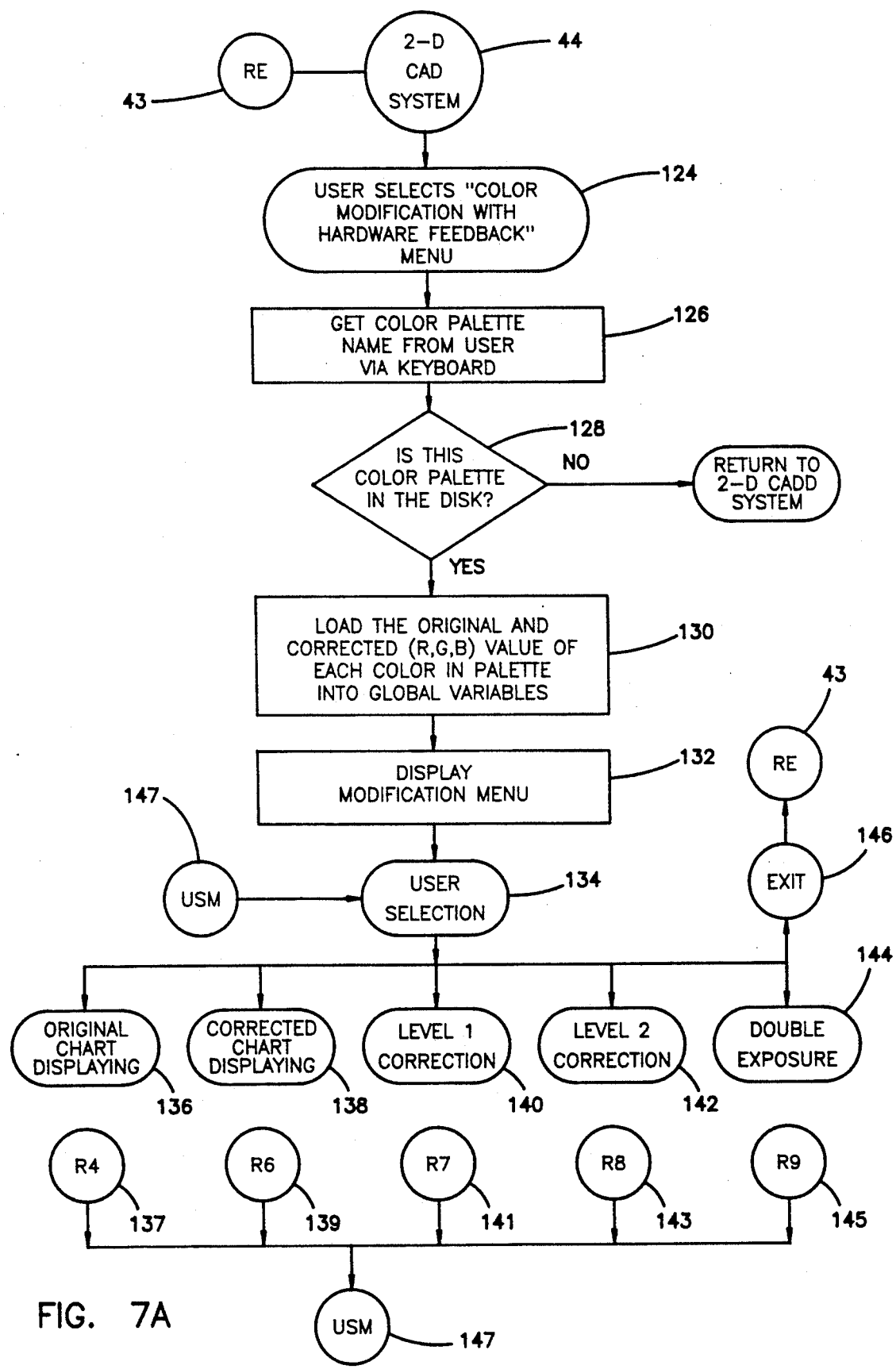
FIG. 7a is a flowchart illustrating the color modification using hardware feedback functions of the present invention.

The flow diagram for the function which determines corrected colors using hardware feedback (36) is illustrated in FIG. 7a. When this function is selected (124), the user is prompted to enter (126) the name of the desired color palette using keyboard 16. The system then retrieves the registered colors and corresponding corrected colors, if any, from this palette file in the storage unit 20 and stores them in a set of global variables (130). If the specified palette does not exist in the storage unit (128), this function is terminated and control passes back to the two-dimensional CAD system (44). The system displays a menu (132) for user to select (134) various subfunctions 136-144.

If the "Display registered color chart" function 136 is selected, the system displays all the registered colors of the current color palette in an array of colored squares on the graphic CRT. The user instructs the system to send this color chart to the output device to obtain a photograph or printout, and then reenters this photograph, or printout into the system using an input device such as scanner 21 or video camera 22 using conventional techniques. Once the previous step has been completed, the "Calculate corrected color" function (Level 1 correction) function 140 is selected. The flowchart for the Level 1 correction function is illustrated in FIG. 7b. The system will prompt the user to select an area of the color chart via an input device such as mouse 14 or light pen 10 to be corrected and obtain (250) the (X, Y) coordinates of the area selected by the user. The system then scan-converts the selected area by reading the (R, G, B) values of each pixel (252-262) of the inputted hard-copy. After reading in the new (R, G, B) values, the system calculates the "error" caused by the output/input cycle (256) and finds a corrected color (258) for each registered color.

Assuming that an existing registered color has an (R, G, B) value (rR, rG, rB), and the new (R, G, B) value after the output/input cycle is (nR, nG, nB), then the "error" is: (eR, eG, eB)=(rR−nR, rG−nG, rB−nB). Adding this "error" to the original color (rR, rG, rB), the corrected color is:

$$(cR, cG, cB) = (rR+eR, rG+eG, rB+eB). \quad (1)$$

The corrected colors determined during this function are stored in the global variables along with their associated registered color.

Once each registered color in a palette has a corrected color, the user can apply this color palette to an image in a manner that will be set forth in detail in Section C (Correcting Image). If the image produced is still not satisfactory, then the user may fine-tune the corrected colors by selecting the "Display corrected color chart" subfunction to display all of the corrected colors in an array of squares, and the same output/input procedure as applied to the original registered colors is repeated. After the output/input cycle, the corrected color chart is again displayed on the screen and the user selects the "Modify corrected color" function (Level 2 Correction) to cause the system to determine the composite error between the modified corrected colors and the associated registered colors, in the same manner as in the "Calculate corrected color" function, by comparing the (R, G, B) values of the previous corrected colors with those just entered. In this manner, a new set of corrected colors is generated to replace the old one.

To fine-tune the corrected color, the "Display corrected color chart" function 138 and "Modify corrected color" (Level 2 correction) function 142 are selected. Functions 138 and 142 are essentially the same as the "Display registered color chart" function 136 and "Calculate corrected color" function 140 respectively except that the corrected colors previously determined by functions 136 and 140, not registered colors, are displayed and analyzed. If the new (R, G, B) value after the output/input cycle of the corrected color (cR, cG, cB) is (nR, nG, nB) and let:

$$D1R=cR-rR, \ D1G=cG-rG, \ D1B=cB-rB$$

$$D2R=rR-nR, \ D2G=rG-nG, \ D2B=rB-nB$$

then the new corrected color (ncR, ncG, ncB) is $$ncR=rR+(D1 R \times D1R)/(D1R-D2R);$$

$$ncG=rG+(D1G \times D1G)/(D1G-D2G);$$

$$ncB=rB+(D1B \times D1B)/(D1B-D2B).$$

While performing functions 138 and 142 to display corrected color, it is possible that one or more of the corrected colors' (R, G, B) component values will exceed 255, which is the maximum value that the graphic CRT 10' can display directly. When the "Display corrected color chart" function 138 is selected, the system will give an indication on the graphic CRT, such as "Displayed colors over 255", to apprise the user if certain displayed color values exceed the maximum. Along with providing this indication, the graphic CRT will display the excessive color values at a maximum (255) allowable intensity and will prompt the user to send this first color chart to the output device such as camera 26 as the first exposure. All colors that are below maximum intensity are displayed on the graphic CRT in their actual (R, G, B) values. After the first exposure is completed, the system prompts the user to reinsert the same film cartridge into output camera 26 for the second of a double exposure and to select the "Display colors over 255" or "Double Exposure" function 144.

The "Double Exposure" function is illustrated in FIG. 7c. This function alters the color chart display on the graphic CRT by scan-converting the color chart (264–272) and deleting all color components less than 255 from the image of the color chart by subtracting 255 from each of the "overflow" color components i.e., those that exceed 255 (268). The user is then prompted to send this modified chart to the output camera (274) for a second exposure on the same film. The "overflow" color components compound the color values on the film from the first exposure to produce the correct color.

Each time the "Display corrected color charts" and "Modify corrected color" functions 138 and 142 are selected, a new set of corrected colors is generated in the manner previously set forth to replace the previous ones. Repeated use of these two functions should achieve optimal corrected colors. While the hardware feedback function may be applied to essentially any input/output interface, it is very important that the same input/output device be used throughout the correction procedure to obtain accurate results. If the registered colors are registered from an image entered from an input camera but the photograph for the registered colors is reentered using the scanner, then there is an additional "error" between the scanner and camera, that adversely affects the accuracy of the results. When "Exit" 146 is selected by the user, all the global variables associated with the registered and corrected colors are stored to the storage unit 20 in the file for the current palette and control passes back to the two-dimensional CAD system (43, 44).

2. User Judgment

The second method (38) for finding corrected colors for registered colors provides tools to the user for creating and selecting possible corrected colors. The user, not the system, determines the desirable corrected colors. When the "Select Corrected Color" function 38 is selected, a plurality of colors having (R, G, B) values which vary slightly from a registered color are displayed as squares in a color chart and the user is prompted to send the chart to the output device. The user then selects from the hard-copy the square having the color that most closely matches the registered color displayed on the graphic CRT.

To execute the second method, the following menu is provided:

Display color chart based on registered color
Display color chart based on corrected color
Register corrected color When "Display color chart based on registered color" is selected, the user is prompted to specify the name of the color palette of interest, and the system displays all registered colors for the palette in an array of squares in the menu area and prompts the user to pick the registered color of interest with a locating instrument. After a registered color ("current registered color") is selected, the system then prompts user to select the range of the colors to be displayed by selecting a range number. The smaller the number entered, the smaller the difference among the colors of the displayed chart. Once a range is selected, the system then displays a new color chart on the graphic CRT which is composed of colors whose (R, G, B) components are obtained by slightly varying the current registered color. Each chart normally has 30 to 60 different colors with the original registered color displayed as a large area in the middle of the chart. The user is then prompted to send the color chart to the output device. By comparing each color on the hard-copy photograph or print with the original registered color displayed on the graphic CRT, the user judges which colored square produces the color on the photograph that most closely matches the registered color. This color will then be selected as the first corrected color candidate for the current registered color.

The "Register corrected color" function allows user to select the color square that will be designated the corrected color for the current registered color. The system will prompt the user to pick the corrected color from the color chart on the graphic CRT according to its location on the hard-copy using a locating instrument, and prompts the user to pick the corresponding registered color from the menu area. The registered color and its new corrected color are both stored as a pair.

Once an initial corrected color is selected, the user may fine-tune the corrected color by selecting "Display color chart based on corrected color" function. This function is identical to the "Display color chart based on registered color" function, except that the colors displayed in the chart are variations of the presently selected corrected color of the current registered color. By sending the displayed chart to the output device and evaluating the hard-copy, the user again selects a color that the user judges to be closest to the displayed corrected color. By initially using a larger range number and gradually decreasing the range number while repeating this function, the user can quickly find the desired corrected colors efficiently.

Figure 8:
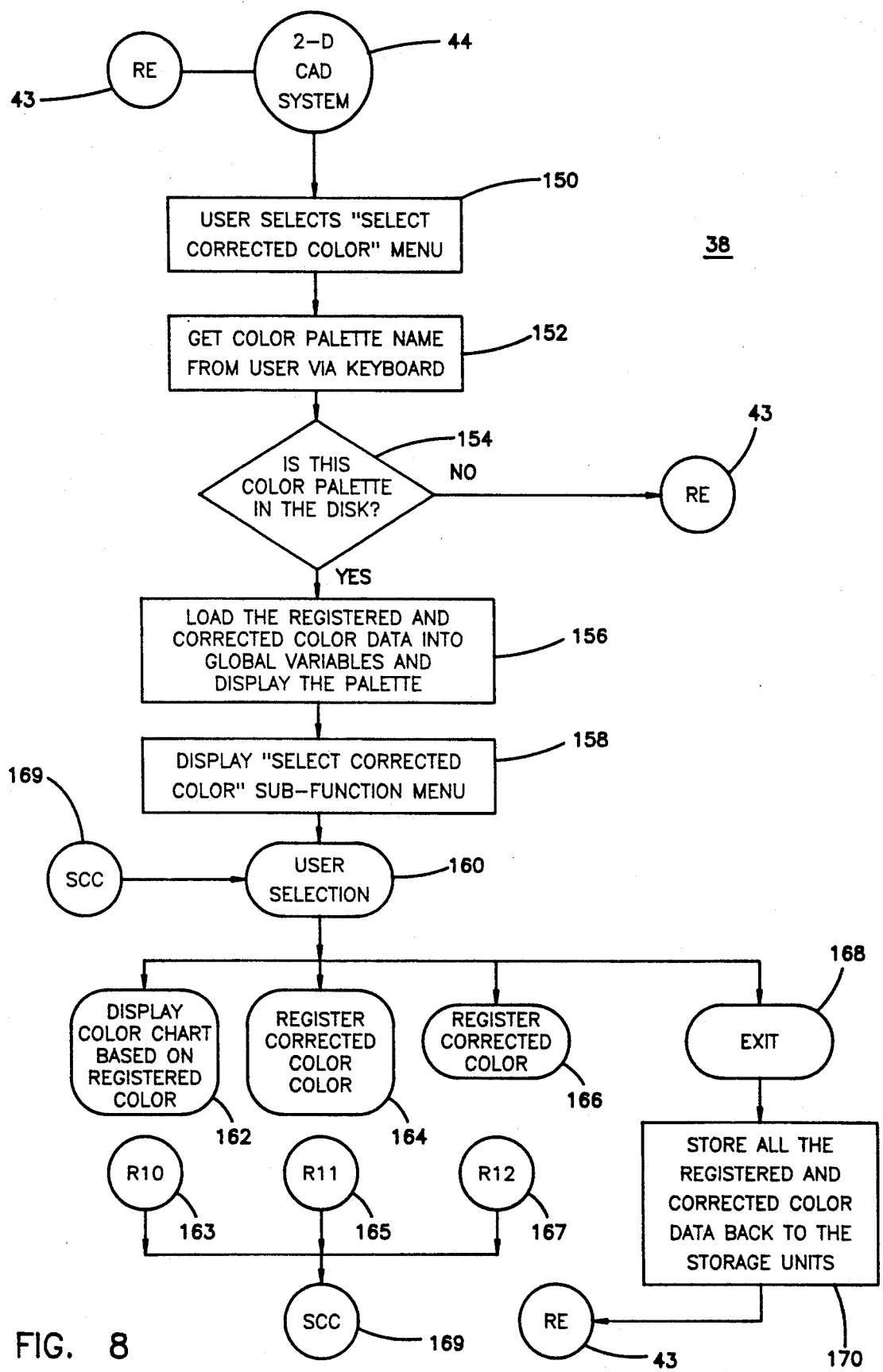
FIG. 8 is a flowchart illustrating the color modification with user judgment functions of the present invention.

When the "Select Corrected Color" function is selected, steps 150 to 156 (FIG. 8) are performed in a manner that is identical to steps 124 to 130 in FIG. 7. A desired color palette will be retrieved from the disk and the parameters for the registered and corrected colors of the palette will be loaded into global variables. The menu choices for this function are displayed (158) and the user is prompted (160) to select a subfunction from the menu. There are three subfunctions 162–166 for user to select, plus an "Exit" function.

FIG. 9 illustrates the flow diagram for the "Display color chart based on registered color" function 162. When this function is selected, the user is prompted to select (172) the registered color of interest from the color palette using a locating instrument. Once a valid registered color is selected, the user is prompted to enter (174) a range number such as 1, 2 or 3 via the keyboard. The larger the number entered, the bigger the difference among the colors of the displayed chart. The system then generates (176) 30 to 60 colors to be included in a color chart by increasing and decreasing each of the (R, G, B) components of the registered color as a function of the range number selected. The generated color chart is displayed (176) on the graphic CRT with the registered color in the center. The user is then prompted to instruct the system to send the displayed chart to the output device for producing a hard-copy photograph or print.

FIG. 10 illustrates the flow diagram for the "Display color chart based on corrected color" function 164. The steps in this function are identical to those in FIG. 9, except that the chart is generated based on the corrected color of a registered color rather than the registered color. When a registered color is selected (178) and a range number is entered 180 by user, the corrected color of the selected registered color is retrieved from the global variable and new colors are generated (182). Since these colors in the chart include variations of the (R, G, B) values of the current corrected color, the user may find a better corrected color than the previous one from this chart. Once the color chart is displayed on the screen, the chart image is sent to the output device. The user then determines which color of the color chart on the photograph or print is closest to the registered color.

FIG. 11 illustrates the flow diagram of the "Register corrected color" function 166. When this function is selected, the user is prompted to select a color from the charts generated by subfunction 162 or 164 for inclusion in the list of corrected colors. With a chart displayed on the graphic CRT, the user is prompted to select a registered color from the color palette (186) using a locating instrument and to select (188) the corrected color selected by the user to correspond to the registered color. After both colors are picked by the user, the system then pairs them together and stores them in global variables. When the user selects the "Exit" subfunction, this function 38 is exited and the color data stored in the global variables are stored (170) to the storage unit for later retrieval. Control passes back to the two-dimensional CAD system (43, 44).

(c) Correcting Image

Once the user has created one or more color palettes containing corrected colors for corresponding registered colors, and with an image whose colors are to be corrected displayed on the graphic CRT 10', correction of the colors of this image (42) may proceed based upon their relationship to the registered colors in the selected color palette. The capability for correcting the image can be provided in a menu with the following choices:

Correct flat-colored image
Correct continuously-colored image

After the user has specified the color palette to apply to the image., this function will use the registered colors and their corrected colors in the specified color palette to adjust the (R, G, B) values for all pixels in the image based upon their relationship to the registered colors. To apply this function, the user must determine whether the image to be corrected is a flat-colored image or a continuously-colored image. A flat-colored image is an image composed of only "pure" colors with large regions of the image having only a single color rather than a mixture of similar colors. A continuously-colored image is an image composed of many colors, with many similar colors in a small region of space combined to give the appearance of a single color. Most photograph images are continuously-colored images, whereas an image created using a "paint program", which is a standard feature of many two-dimensional CAD systems, will typically be a flat-colored image.

Figure 12A:
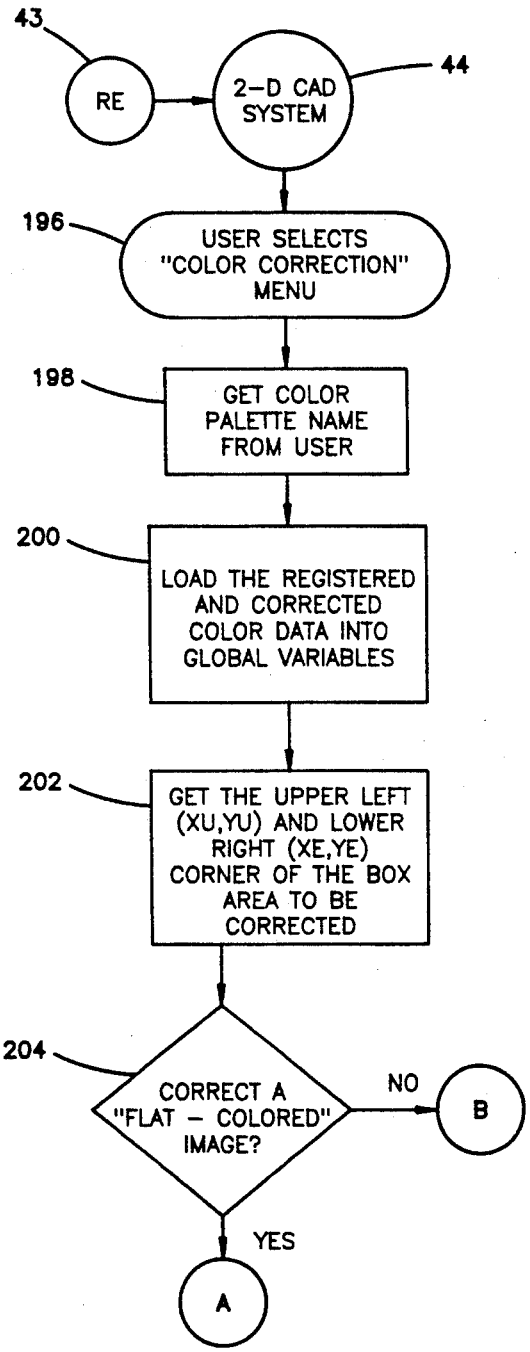
FIGS. 12a and 12b are a flowchart illustrating the color correction function of the present invention.

FIGS. 12-14 illustrate the flowchart for the color correction function. Before selecting this function, the user should, 1) Display the image to be corrected on the graphic CRT; and 2) Know which color palette has the desired registered and corrected colors for correcting the displayed image.

Figure 12B:
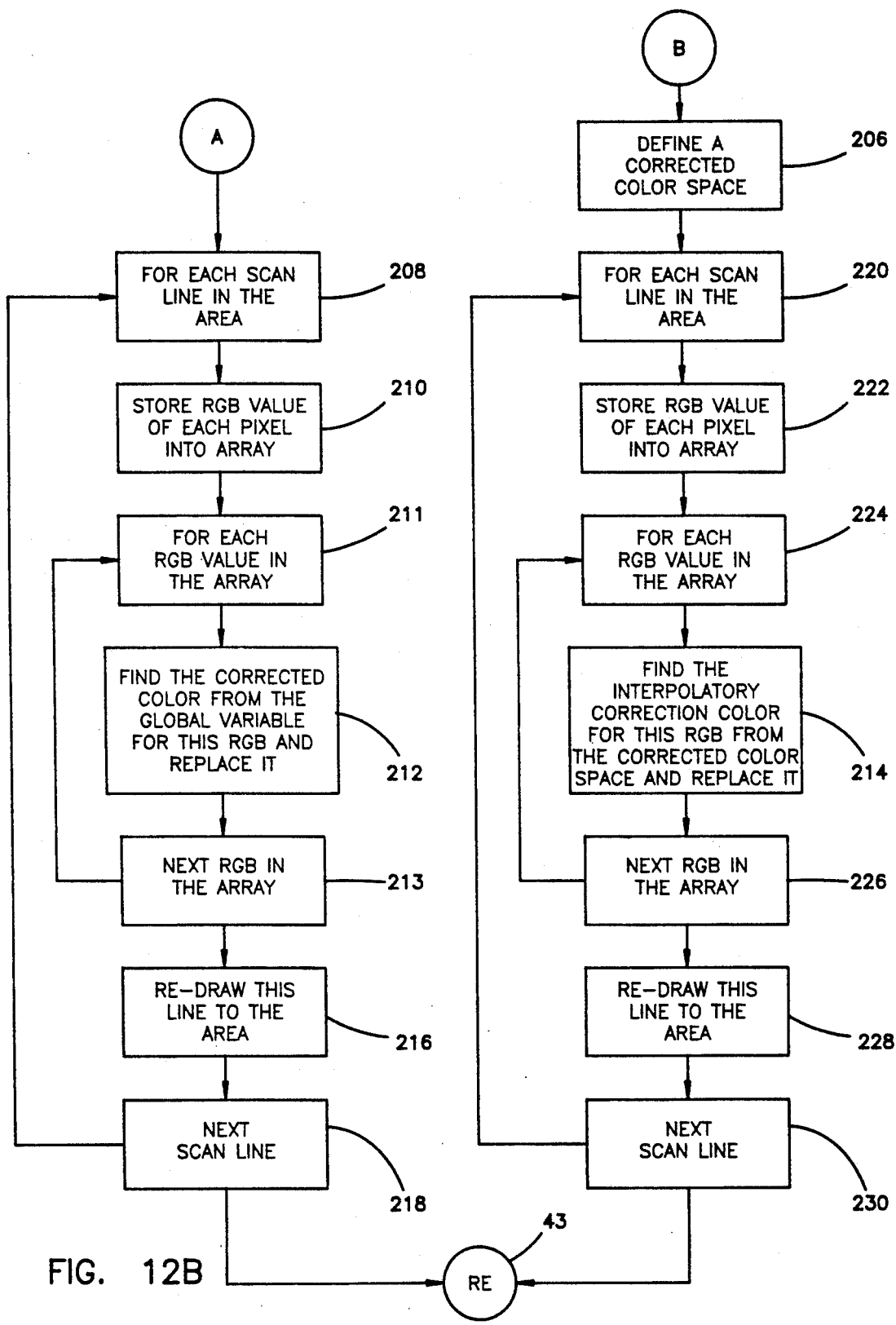

Referring to FIG. 12, when the user selects the "color correction" function 42, the system prompts the user (198) to specify the color palette to apply and stores the color data (200) from that palette into the global variables. The system prompts the user to locate (202), using a locating instrument, the upper left corner (Xu, Yu) and the lower right corner (X1, Y1) of the area of the displayed image to which correction is to be applied. The system then prompts the user to select (204) one of the two subfunctions, "Correct flat-colored image" and "Correct continuously-colored image", to use in correcting the image. If "flat-colored image" is selected, the system scans the specified area horizontally from Yu to Y1 and modifies the colors of the image area line by line 208-218 (FIG. 12b). For each scan line from Xu to X1, and for each pixel in each line (for Xu to X1), the system stores (210) the (R, G, B) parameters into a temporary array of variables. The system compares the (R, G, B) value for each pixel in the array to the global variables containing the color data for the current registered colors and the corrected colors to find the matching registered color, and replaces (212) the color of the pixel with the corresponding corrected color. If no registered color matching the (R, G, B) value of a particular pixel is found, the (R, G, B) value of this pixel is unchanged.

If the user selects the "continuously-colored" subfunction at 204, the system will first redefine the color space (206) based on the positions of the registered and corrected colors in the regular color space. As illustrated in FIG. 13, in order to redefine the color space, the system will retrieve the values of the corrected colors and corresponding registered colors (232) and subdivide the color space into tetrahedrons (234) based on the positions of the registered colors in the color space. The data structure for each tetrahedron includes the location of its four vertices including the (R, G, B) coordinates of the registered color, and the (R, G, B) values of the associated corrected color (236). Once the new color space is established, a unique interpolation method is applied (220-230) to each pixel in the image to determine a corrected color (FIG. 12b).

For "continuously-colored" images, the system will calculate the (R, G, B) value of the corrected color to replace the original (R, G, B) value of each pixel in the image by a Color Cube Subdivision technique. This technique is an interpolation technique utilizing the color space that has been defined in step 206. The coordinates in the color space that include registered colors having corresponding corrected colors and the coordinates of the corners of the space or cube, define the vertices of tetrahedrons that subdivide the entire color space into 3-D volumes. Once the new color space is defined, it is tested for no separation or overlap of the tetrahedrons for proper size and shape in the tetrahedrons.

Once the color space has been subdivided into tetrahedrons, with each tetrahedron enclosing some volume of the color space, color coordinates within the color space that do not correspond to existing registered colors will fall within the volume defined by one of the tetrahedrons, and the corrected color assigned to such coordinates will be determined through interpolation of the corrected colors previously identified for the color points serving as the vertices of the tetrahedron. During this interpolation process, each of the tetrahedron vertices will have some influence over the corrected color value assigned to such coordinate; the closer the coordinate is to a vertex, the more the color value will be influenced by the corrected color value of the vertex.

A linear interpolation method (214) uses the distance of a coordinate in the color space from a vertex and from the plane defined by the other three vertices in the tetrahedron to determine the amount of influence of the vertex on the corrected color value assigned to the coordinate. If the coordinate is the same distance from the plane as is the current vertex, the coordinate would coincide with the current vertex, and the assigned corrected color value would be that corresponding to the vertex. Conversely, if the coordinate lies in the plane, the assigned corrected color value would not be influenced by the corrected color value of the vertex. If the coordinate lies between the vertex and the plane, the amount of influence of the vertex to the corrected color value assigned to the coordinate is proportional to the distance of the coordinate from the plane. This interpolation is performed for all four vertices in the tetrahedron, and the distance ratios are summed and adjusted so they add up to one. The final corrected color value assigned to the coordinate in the new defined color space is determined as a function of these ratios and the corrected color values assigned to the vertices of the tetrahedron.

FIG. 14 illustrates the flowchart for interpolating the corrected color. The system examines (238) each tetrahedron in the new color space to find the one containing the (R, G, B) coordinate of the image pixel to be corrected. Then the distances from this coordinate to each vertex of the tetrahedron and the distances to each plane defined by the other three vertices are calculated (240, 242). The ratio of "influence" of each vertex over the final corrected color is determined (244, 246) proportional to the distances calculated in 240 and 242. Once the ratios are determined, the corrected color value of this point is calculated (248) by multiplying the ratio of each vertex to the value of its corresponding corrected color to get its "contribution" to the (R, G, B) components, and adding the contributions from each vertex together to get the final (R, G, B) value of the corrected color for the pixel. Finally, the original color of the pixel is replaced by this corrected color in the array and the correction procedures are applied to next pixel until all the pixels in the array are corrected. The array of colors defining the displayed image is replaced with the proper corrected colors.

If the image produced by applying the current set of corrected colors obtained from the previous function is not satisfactory, then the user may fine-tune the corrected colors to obtain more satisfactory corrected colors and repeat the color correction function.

Changes and modifications in the specifically described embodiments can be carried out without departing from the principles of the invention. Although the invention has been illustrated for correcting errors introduced by producing hard-copy outputs of an image, it is to be understood as applying equally to other output techniques such as video tape or the like. The invention may be applied to any process in a CAD system that induces error in the color components of an image and is not limited to output processes. The protection afforded the invention is intended to be limited only by the scope of the appended claims, as interpreted according to the principles of patent law including the doctrine of equivalents.

The embodiments of the invention in which an exclusive property or privilege is claimed are defined as follows:

1. In a computer-assisted design system, a method for correcting color errors introduced in computer-generated images during a process performed on images by said computer-assisted design system including the steps of:
   (a) creating a chart having a portion displaying an original color with a predetermined value of a color parameter and a plurality of other portions each displaying a color having a value of said color parameter in a manner that said color parameter values of said other portions vary incrementally from said predetermined value;
   (b) performing said process on said chart to produce thereby a modified chart having modified colors in the same said portions as said portion displaying an original color and said other portions as modified by said process;
   (c) examining said modified colors in said modified chart and selecting one of said modified colors that resembles said original color more than the other said modified colors resemble said original color;
   (d) determining an error value in response to the difference between the value of said color parameter of said selected one of said modified colors and said predetermined value of said color parameter;
   (e) identifying pixels in an image that have said predetermined value of said color parameter and adjusting the value of said color parameter of said pixels as a function of said error value; and
   (f) performing said process on said image after step (e).

2. The method for correcting color errors in claim 1 further including the steps of:
   (g) creating a second chart having a portion displaying a second original color with a second predetermined value of said color parameter and a plurality of other portions each displaying colors having values of said color parameter that vary incrementally from said second predetermined value;
   (h) repeating steps (b)–(d) on said second chart to determine a second error value; and
   (i) identifying other pixels that are in said image and have said second predetermined value of said color parameter and adjusting the value of said color parameter of said other pixels as a function of said second error value, prior to step (f).

3. The method for correcting color errors in claim 2 wherein step (a) includes selecting an amount by which said value of said color parameter of said plurality of colors varies from said predetermined value.

4. In a computer-assisted design system having a graphic display device and a hard-copy output device a method for correcting color errors introduced in computer-generated images including the steps of:
   (a) displaying on said graphic display device a chart including a group of pixels each having a predetermined value of a color parameter defining an original color and a plurality of other groups of pixels, each of said other groups having values of said color parameter that vary incrementally from said predetermined value defining a plurality of other colors;
   (b) creating a hard-copy of said chart having modified colors corresponding to said original color and said other colors as modified by said creating;
   (c) examining said modified colors in said hard-copy of said chart and selecting one of said modified colors that resembles said original color more than the other said modified colors resemble said original color;
   (d) repeating steps (a)–(c) substituting said selected one of said modified colors for said original color;
   (e) determining an error value in response to the difference between the value of said color parameter of said one of said colors obtained in step (d) and said predetermined value of said color parameter;
   (f) identifying pixels in an image that have said predetermined value of said color parameter and adjusting the value of said color parameter for said pixels in said image as a function of said error value; and
   (g) creating a hard-copy of said image.

5. The method for correcting color errors in claim 4 further including the steps of:
   (h) displaying on said graphic display device a second chart including another group of pixels each having a second original color with a second predetermined value of said color parameter and a plurality of other groups of pixels each of said other groups having values of said color parameter that vary from said second predetermined value;
   (i) repeating steps (b)–(e) on said second chart to determine a second error value; and
   (j) identifying other pixels that are in said image and have said second predetermined value of said color parameter and adjusting the value of said color parameter of said other pixels as a function of said second error value, prior to step (g).

6. The method for correcting color errors in claim 5 wherein said step (f) further includes adjusting the value of said color parameter for pixels that are in the image and have a value that is not one of said predetermined values in relation to a combination of said first and second error values.

7. In a computer-assisted design system having a graphic display device, a hard-copy output device and an input device, a method for correcting color errors introduced in computer-generated images including the steps of:
   (a) selecting in said computer-assisted design system an original color having a predetermined value of a color parameter;
   (b) sending said original color to said output device and thereby creating a hard-copy, said hard-copy displaying a modified original color that is different from said original color as a result of said creating;
   (c) entering said modified original color to said computer-assisted design system by reading said hard-copy using said input device;
   (d) determining the value of said color parameter for said modified original color;

(e) determining an error value in response to the difference between the value of said color parameter of said modified original color obtained in step (d) and said predetermined value of said color parameter; and (f) adjusting the value of said color parameter for particular pixels in an image as a function of said error value; and (g) sending said image to said output device to create another hard-copy displaying said image.

8. The method for correcting color errors in claim 7 further including the steps of:

(h) selecting a second original color with a second predetermined value of said color parameter;

(i) repeating steps (b)–(e) on said second original color to determine a second error value; and (j) adjusting the value of said color parameter for particular pixels in said image as a function of said second error value, prior to step (g).

9. The method for correcting color errors in claim 8 wherein said step (f) includes adjusting the value of said color parameter for pixels that are in the image that have a value of said color parameter that is substantially the same as said original color as a function of said error value and said step (j) includes adjusting the value of said color parameter for pixels that are in the image that have a value of said color parameter that is substantially the same as said second original color as a function of said second error value.

10. The method for correcting color errors in claim 9 further including adjusting the value of said color parameter for pixels that are in the image that have a value of said color parameter that is not substantially the same as one of said original color and said second original color as a function of at least one of said first and second error values.

11. In a computer-assisted design system having a graphic display device, a hard-copy output device, and an input device, a method for correcting color errors introduced in computer-generated images including the steps of:

(a) selecting an original color having a predetermined value of a color parameter;

(b) sending said original color to said output device and thereby creating a hard-copy, said hard-copy displaying a modified original color that is different from said original color as a result of said creating;

(c) entering said modified original color to said computer-assisted design system by reading said hard-copy using said input device;

(d) determining the value of said color parameter for said modified original color;

(e) determining an error value in response to the difference between the value of said color parameter of said modified original color obtained in step (d) and said predetermined value of said color parameter;

(f) adjusting the value of said color parameter for said original color to obtain a corrected original color;

(g) repeating steps (b)–(e) for said corrected original color to determine a second error value;

(h) determining a composite error value from said error value and said second error value;

(i) adjusting the value of said color parameter for particular pixels in an image as a function of said composite error value; and (j) sending said image to said output device to create another hard-copy displaying said image.

12. The method for correcting color errors in claim 11 further including the steps of:

(k) monitoring the level of said value in step (f);

(l) if said level in step (f) exceeds a predetermined maximum value, repeating step (j) on the same said hard-copy with said value reduced by a predetermined amount wherein said another hard-copy is created by double exposing said hard-copy created in step (j).

13. The method for correcting color errors in claim 11 further including the steps of:

(m) selecting a second original color with a second predetermined value of said color parameter; and (n) repeating steps (b)–(i) on said second chart to determine a second composite error value, prior to step (j).

14. The method for correcting color errors in claim 13 wherein said step (i) includes adjusting the value of said color parameter for pixels that are in the image and have said predetermined value of said parameter in relation to said composite error value and adjusting the value of said color parameter for pixels that are in the image and have said second predetermined value of said parameter in relation to said second composite error value.

15. The method for correcting color errors in claim 14 wherein said step (i) further includes adjusting the value of said color parameter for pixels that are in the image and have a value that is not one of said predetermined values in relation to a combination of said composite error values.

16. In a computer-assisted design system, a method for correcting color errors introduced in computer-generated images during a process performed on images by said computer-assisted design system including the steps of:

(a) for each of a plurality of original colors having an original value of a color parameter, determining a corrected value of said parameter that will be modified substantially to the corresponding said original value by said process;

(b) for an image composed of an array of pixels, each of said pixels having a value of said color parameter, replacing said value of said color parameter with the corresponding said corrected value for pixels having an original value of said color parameter and replacing said value of said color parameter with a corrected value being interpolated from a three-dimensional color space defined from at least one of said original values for pixels not having an original value of said color parameter; and (c) applying said process to said image after step (b).

17. The method for correcting color errors in claim 16 wherein said process is producing a hard-copy of an image displayed on a graphic display.

18. The method for correcting color errors in claim 16 wherein a corrected value for pixels not having an original value of said color parameter is interpolated from the corrected value of the closest said original value within said three-dimensional color space.

19. The method for correcting color errors in claim 18 wherein said color parameter is defined in three-dimensional coordinates, each one of said coordinates being variable between zero and a maximum value defining a cube; and further wherein corrected values are interpolated from other corrected values by the steps of defining said three-dimensional color spaces as a plurality of tetrahedrons, each of said tetrahedrons having an original value of said color parameter at one vertex thereof and corners of said cube at the other vertices thereof; and determining the tetrahedron in which a value of said color parameter is positioned for pixels not having an original value of said color parameter.

20. The method for correcting color errors in claim 19 wherein said step of determining further includes determining the distances of said value from each plane defined by three vertices of the tetrahedron in which said value is positioned.

21. The method for correcting color errors in claim 20 wherein said step of determining further includes constructing the corrected value for said value as a function of said distances and the corrected values for the vertices of the tetrahedrons in which said value is positioned.

22. A color correcting system for correcting color errors introduced in computer-generated images in a computer-assisted design system having graphic display means for displaying an image, image input means for inputting an image into said design system and image output means for producing hard-copies of images displayed on said display means, said correcting system comprising:
   first means for receiving a user selection of at least one original color having an original value of a color parameter and for sending said original color to said output means to produce a hard-copy having a modified original color with a modified original value, wherein said output means cause said modified original value to be different from said original value;
   second means responsive to said input means for determining an error value as a function of the difference between said original value and said modified original value for hard-copies produced by said first means and entered through said input means and for defining a corrected color as a function of said original value and said error value;
   third means for storing original colors and corresponding corrected colors for processing by a digital computer; and
   fourth means for adjusting the color parameter of an image displayed on said graphic display means by replacing the original colors of said image with the corresponding corrected colors.

23. The color correcting system in claim 22 in which said adjusting means includes means for interpolating between corrected colors in order to correct colors of an image displayed on said graphic display means that are not original colors.

24. The color correcting system in claim 23 in which said interpolating means includes means for establishing a color space as a function of the color values of said original colors, means for locating the position of a color value in said color space and means for interpolating between the color value of corrected colors corresponding to said original colors in response to said position.

25. The color correcting system in claim 22 in which said first means further includes means for generating a chart having said original color and a plurality of other areas colored with colors whose color parameter varies incrementally from said original color and means for receiving a user selection of one of said other areas the user judges to be the close to the original color whereby the user operates said indicating means after comparing a hard-copy of said chart with the said chart displayed on said graphic display means.

26. The method for correcting color errors in claim 7 including the steps of:
   (h) monitoring the level of said value in step (f);
   (i) if said level in step (f) exceeds a predetermined value, repeating step (g) on said same hard-copy with said value reduced by a predetermined amount wherein said another hard-copy is created by double exposing said hard-copy created in step (g).

27. A color correcting system for producing hard-copies of an image in a manner that corrects color errors introduced in computer-generated images in a computer assisted design system having graphic display means for displaying an image, image input means for inputting an image into said design system and image output means for producing hard-copies of images displayed on said display means, said correcting system comprising:
   first means for receiving a user selection of at least one original color having an original value of a color parameter and for sending said original color to said output means to produce a calibration hard-copy;
   second means responsive to said input means for determining a corrected color from said calibration hard-copy and said original color, said corrected color relating to said original color in a manner that the corrected color will have approximately the same value of said color parameter as said original color in said image when said image is produced by said image output means as an image hard-copy;
   third means for storing at least one said original color and a corresponding said corrected color for processing by a digital computer; and
   fourth means for correcting said image in said digital computer by replacing said at least one original color of said image with said corresponding corrected color.

* * * * *